(12) United States Patent
Bringewatt et al.

(10) Patent No.: US 8,276,292 B2
(45) Date of Patent: Oct. 2, 2012

(54) METHOD FOR RECOVERING HEAT ENERGY RELEASED BY LAUNDRY MACHINES

(75) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 364 days.

(21) Appl. No.: 11/736,643

(22) Filed: Apr. 18, 2007

(65) Prior Publication Data

US 2007/0251115 A1    Nov. 1, 2007

(30) Foreign Application Priority Data

Apr. 26, 2006  (DE) .......................... 10 2006 020 003

(51) Int. Cl.
*F26B 3/00* (2006.01)
(52) U.S. Cl. ............ 34/443; 34/513; 165/901; 62/238.7
(58) Field of Classification Search ............... 34/90, 86, 34/413, 443, 497, 513; 165/901; 62/238.7
See application file for complete search history.

(56) References Cited

U.S. PATENT DOCUMENTS

| | | | | |
|---|---|---|---|---|
| 2,186,836 A * | 1/1940 | Mcglaughlin | ................. | 210/211 |
| 3,050,867 A * | 8/1962 | Friedman | ............................ | 34/86 |
| 3,771,238 A * | 11/1973 | Vaughn | ............................... | 34/86 |
| 3,955,358 A * | 5/1976 | Martz et al. | ................. | 60/39.182 |
| 4,034,482 A * | 7/1977 | Briscoe | ............................ | 34/513 |
| 4,137,647 A * | 2/1979 | Clark, Jr. | ............................ | 34/82 |
| 4,275,510 A * | 6/1981 | George | ............................... | 34/90 |
| 4,326,344 A * | 4/1982 | Smith | ............................... | 34/566 |
| 4,348,818 A * | 9/1982 | Brown | ............................... | 34/77 |
| 4,401,261 A * | 8/1983 | Brown | ............................... | 236/10 |
| 4,412,391 A * | 11/1983 | Bolognino | ......................... | 34/90 |
| 4,434,564 A * | 3/1984 | Braggins, Jr. | ..................... | 34/86 |
| 4,447,965 A * | 5/1984 | Bray | ............................... | 34/416 |
| 4,466,202 A * | 8/1984 | Merten | ............................ | 34/470 |
| 4,485,571 A * | 12/1984 | Berger et al. | ..................... | 38/14 |
| 4,488,364 A * | 12/1984 | Herschel | .......................... | 34/86 |
| 4,509,345 A * | 4/1985 | Alio | ................................. | 68/20 |
| 4,541,479 A * | 9/1985 | Bergeron, Jr. | .................. | 165/45 |
| 4,546,511 A * | 10/1985 | Kaufmann | ...................... | 8/158 |
| 4,549,362 A * | 10/1985 | Haried | ............................ | 34/395 |
| 4,602,676 A * | 7/1986 | Bergeron, Jr. | .................. | 165/45 |
| 4,651,805 A * | 3/1987 | Bergeron, Jr. | .................. | 165/45 |
| 4,660,627 A * | 4/1987 | Deck | ............................... | 165/86 |
| 4,665,628 A * | 5/1987 | Clawson | ......................... | 34/449 |
| 4,669,199 A * | 6/1987 | Clawson et al. | ................. | 34/82 |
| 4,891,892 A * | 1/1990 | Narang | ............................ | 34/86 |
| 4,928,749 A * | 5/1990 | Paull | ............................. | 165/119 |

(Continued)

FOREIGN PATENT DOCUMENTS

DE        3308708 A1 *   8/1983

(Continued)

*Primary Examiner* — Stephen M. Gravini
(74) *Attorney, Agent, or Firm* — Laurence P. Colton; Smith Risley Tempel Santos LLC

(57) ABSTRACT

The use of at least one central heat exchanger to extract and dry the heat energy released by laundry machines, in particular their gland steam. The energy thus recovered can be fed back to the laundry machines as hot air or hot water. This represents a significant reduction in the energy requirements of laundry machines as laundry machines discharge a great amount of unused energy into the environment, which, particularly in light of rising energy prices, represents an unnecessary operational cost for a laundry.

4 Claims, 1 Drawing Sheet

U.S. PATENT DOCUMENTS

| | | | |
|---|---|---|---|
| 4,930,571 A * | 6/1990 | Paull | 165/111 |
| 4,934,283 A * | 6/1990 | Kydd | 110/246 |
| 5,000,003 A * | 3/1991 | Wicks | 60/618 |
| 5,123,479 A * | 6/1992 | Pravda | 165/86 |
| 5,131,887 A * | 7/1992 | Traudt | 454/255 |
| 5,417,278 A * | 5/1995 | Pipher et al. | 165/104.11 |
| 5,459,945 A * | 10/1995 | Shulenberger | 34/605 |
| 5,546,678 A * | 8/1996 | Dhaemers | 34/275 |
| 5,675,908 A * | 10/1997 | Barnes | 34/235 |
| 5,696,872 A * | 12/1997 | Seward | 392/341 |
| 5,709,041 A * | 1/1998 | Tarplee | 34/595 |
| 5,730,356 A * | 3/1998 | Mongan | 237/19 |
| 5,768,730 A * | 6/1998 | Matsumoto et al. | 8/159 |
| 6,082,125 A * | 7/2000 | Savtchenko | 62/238.6 |
| 6,189,228 B1 * | 2/2001 | Schuette | 34/86 |
| 6,230,980 B1 * | 5/2001 | Hudson | 236/44 A |
| 6,328,095 B1 * | 12/2001 | Felber et al. | 165/54 |
| 6,355,091 B1 * | 3/2002 | Felber et al. | 95/10 |
| 6,364,942 B1 * | 4/2002 | Felber et al. | 96/111 |
| 6,401,524 B1 * | 6/2002 | Incavo et al. | 73/40 |
| 6,557,266 B2 * | 5/2003 | Griffin | 34/168 |
| 6,575,228 B1 * | 6/2003 | Ragland et al. | 165/54 |
| 6,823,135 B1 * | 11/2004 | Greene | 392/496 |
| 6,846,407 B2 * | 1/2005 | Anderson et al. | 210/167.3 |
| 6,904,703 B2 * | 6/2005 | Naganawa et al. | 34/596 |
| 6,948,553 B1 * | 9/2005 | Day et al. | 165/54 |
| 6,966,124 B2 * | 11/2005 | Ryu | 34/134 |
| 6,983,105 B1 * | 1/2006 | Greene | 392/496 |
| 6,988,545 B2 * | 1/2006 | Good | 165/173 |
| 7,055,262 B2 * | 6/2006 | Goldberg et al. | 34/86 |
| 7,074,337 B2 * | 7/2006 | Miller | 210/744 |
| 7,213,349 B1 * | 5/2007 | Brunner et al. | 34/86 |
| 7,220,365 B2 * | 5/2007 | Qu et al. | 252/70 |
| 7,299,638 B2 * | 11/2007 | MacKay | 60/784 |
| 2002/0179514 A1 * | 12/2002 | Anderson et al. | 210/258 |
| 2003/0036820 A1 * | 2/2003 | Yellepeddy et al. | 700/291 |
| 2003/0051367 A1 * | 3/2003 | Griffin | 34/132 |
| 2003/0066638 A1 * | 4/2003 | Qu et al. | 165/186 |
| 2004/0128266 A1 * | 7/2004 | Yellepeddy et al. | 705/412 |
| 2004/0188058 A1 * | 9/2004 | Good | 165/4 |
| 2005/0066538 A1 * | 3/2005 | Goldberg et al. | 34/218 |
| 2005/0072164 A1 * | 4/2005 | MacKay | 60/805 |
| 2005/0086832 A1 * | 4/2005 | Declos | 34/604 |
| 2005/0166909 A1 * | 8/2005 | Maiello et al. | 126/85 B |
| 2005/0230325 A1 * | 10/2005 | Miller | 210/770 |
| 2006/0179676 A1 * | 8/2006 | Goldberg et al. | 34/77 |
| 2006/0180530 A1 * | 8/2006 | Miller | 210/167 |
| 2007/0017113 A1 * | 1/2007 | Scharpf et al. | 34/86 |
| 2007/0251115 A1 * | 11/2007 | Bringewatt et al. | 34/134 |
| 2008/0245087 A1 * | 10/2008 | Orcutt | 62/238.7 |
| 2009/0139107 A1 * | 6/2009 | Grunert et al. | 34/86 |
| 2009/0165328 A1 * | 7/2009 | Grunert et al. | 34/443 |
| 2010/0212866 A1 * | 8/2010 | Bringewatt et al. | 165/104.19 |

FOREIGN PATENT DOCUMENTS

| | | | |
|---|---|---|---|
| DE | 3626887 A1 * | 2/1988 | |
| DE | 102007043212 A1 * | 9/2008 | |
| EP | 503586 A1 * | 9/1992 | |
| EP | 2182106 A1 * | 5/2010 | |
| EP | 2267207 A1 * | 12/2010 | |
| JP | 07213794 A * | 8/1995 | |

* cited by examiner

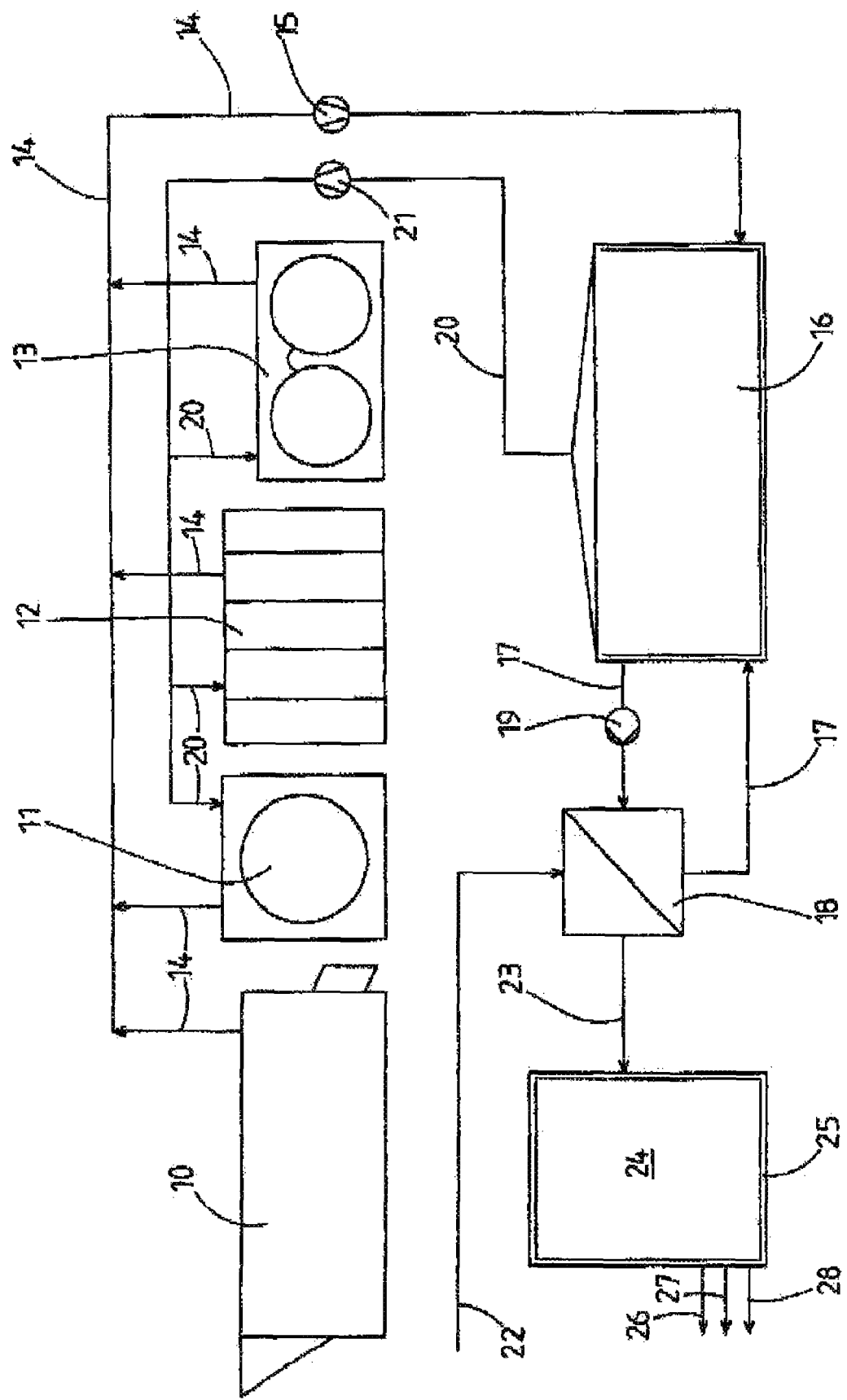

METHOD FOR RECOVERING HEAT ENERGY RELEASED BY LAUNDRY MACHINES

BACKGROUND OF THE INVENTION

1. Technical Field

The invention relates to a method for recovering heat energy released by laundry machines.

2. Related Art

Commercial laundries require considerable quantities of energy, in particular heat energy, for washing, drying and ironing operations. This energy is not discharged from the laundry by the washed items because the laundry items leave the laundry at the same temperature they were delivered as dirty laundry.

Prior to the invention it has been common practice for the entire heat energy released by laundry machines to be vented outdoors without being utilized. Because of continually rising energy costs, the energy required for laundry operations has a substantial impact on their economic efficiency.

BRIEF SUMMARY OF THE INVENTION

Proceeding from the above, one object of the invention is to specify a method for recovering the heat energy released by laundry machines, which can thus reduce the energy requirements of a laundry.

A method for achieving this object is where the heat energy released by a plurality of laundry machines is conducted to at least one common heat exchanger. It is possible to assign groups each comprising a plurality of laundry machines to a central heat exchanger. But it is also conceivable to assign all laundry machines in a laundry establishment or in a room of the laundry to at least one central heat exchanger. This allows for heat recovery to take place centrally. No space is required for the at least one heat exchanger in the region of the respective laundry machines. Above all, the number of heat exchangers for recovering heat can be reduced. There is no need for each laundry machine to be assigned at least one heat exchanger having its own process control.

The invention also provides for converting the heat energy conducted to the at least one heat exchanger into hot water and/or hot air. If the temperature of the hot water or hot air generated in this manner fails to reach the desired temperature for reutilization in a laundry machine, the generated hot air or hot water merely needs to be partially heated to the desired temperature by supplying it with additional energy. But it is also conceivable to generate hot water or hot air having the desired temperature.

Pursuant to a preferred embodiment of the invention, provision is made for conducting the moist hot air accumulating at a plurality or all laundry machines, known as gland steam, but preferably only gland steam, to the or each heat exchanger. The gland steam still contains a large fraction of the energy transferred to the laundry machines. It is therefore particularly rewarding to extract the energy from the gland steam. As the high humidity level of the gland steam does not permit its immediate reutilization, the energy held in the gland steam, namely heat, is recovered by heat exchangers.

In a preferred embodiment of the invention, the gland steam is dehumidified in the heat exchanger. This can be accomplished by various methods using the appropriate heat exchangers known in the art, in particular steam dryers. The gland steam is preferably cooled during dehumidification. In the process, water or some other heat transfer medium is heated up. The energy recovered during this process is reutilized. Furthermore, the dry air resulting from the dehumidification of the gland steam, which is still hot air, can be reused for various purposes, such as heating, but is preferably fed to the appropriate laundry machines, such as dryers, finishers or mangles.

A further method for achieving the object stated at the outset is a method for recovering heat energy released by laundry machines, characterized in that the heat energy released by at least one laundry machine is fed to a first heat exchanger, water is heated by the heat energy in the first heat exchanger and this heated water is cycled in a loop through at least a further heat exchanger, which heats a medium. According to this method, which may also involve a preferred further development of the previously described method, the heat energy from at least one laundry machine is delivered to a first heat exchanger, with water being heated by the latter. The water heated by the first heat exchanger is cycled in a loop through at least a further (second) heat exchanger, which in turn heats water and/or air in a secondary loop. The water employed can be fresh water or wash water. By cycling the water heated in the first heat exchanger through at least one second heat exchanger, the gland steam containing the energy to be recovered is completely isolated from the water or even air to be warmed, or from some other heat transfer medium. As a result, lint, germs or other impurities are kept out of the air, water or the heat transfer medium that is directed back to one or more laundry machines.

The water and/or the air heated by the second heat exchanger is preferably fed to a wash machine, a spin dryer, a dryer, a finisher and/or a mangle. The air to be fed to said laundry machines then does not require any further heating, or if so, only to a slight extent, and is thus an energy-saving measure. The same apples to water, which is fed in particular to a washing machine or a hydroextractor spin-dryer. If fresh water is being used, there is no need to input energy in order to heat cold water up to the predetermined desired temperature. This task is completely or partially accomplished by recovering the energy in the gland steam expelled by the respective laundry machine.

Pursuant to a preferred further development of the method, provision is made for the gland steam to be dehumidified by a first heat exchanger and the dehumidified hot air, if necessary after being additionally heated up, to be fed to a dryer, a finisher and/or a mangle. In this way it is possible to deliver the dehumidified and still warm air back to a laundry machine. Inasmuch as the dehumidified warm air is not hot enough, it can be heated to the desired temperature, for example by an additional heat exchanger.

A further method for achieving the object stated at the outset, which may also be a preferred further development of the previously described method, is a method for recovering heat energy released by laundry machines, characterized in that the moist warm air discharged by at least one laundry machine, namely gland steam, is dried in at least one heat exchanger. This can preferably be a steam dryer. The dried discharged air, preferably the gland steam, of at least one laundry machine can thus be re-used by exploiting the residual heat in the dried hot air.

It is also possible to conduct the dried hot air through a further, preferably second, heat exchanger, which uses the dried hot air to warm the secondary air, in particular fresh air. In this manner it is possible to keep contaminated hot air from the gland steam, in particular hot air containing lint and/or germs, from being supplied to the laundry machine. By warming fresh air by means of the additional heat exchanger, heated uncontaminated air containing the residual energy can be reutilized for supplying the laundry machines in question.

Dehumidified, dry hot air is preferred for use in dryers, mangles and/or finishers.

It is also conceivable to sterilize the air, particularly the hot air dried in the first heat exchanger, particularly before it is fed to a dryer, a mangle, a finisher or some other type of laundry machine.

A further method for achieving the object stated at the outset, which may also be a preferred further development of the previously described method, is a method for recovering heat energy released by laundry machines, characterized in that heat transfer medium heated during the recovery of energy is stored at least in part. Accordingly, in the recovery of energy, heated water, heated air or a heated heat transfer medium, preferably water heated in a further, second heat exchanger, is at least partially stored or temporarily stored. This is expediently carried out in at least one insulated storage container. In this manner, it is possible to store the recovered energy until needed. For example, during down-time intervals in laundry operations, in particular overnight, the warm water recovered on the previous day can be stored until the next working day, thus making it possible to start operations on the next working day with warm water that is immediately available for the laundry machines, thus eliminating the need to heat cold water in order for laundry operations to commence.

The or each heat exchanger preferably charges at least one energy store. Such an energy store can be accessed as needed whenever energy is required at a particular laundry machine or in the entire laundry. The energy store can also accumulate the energy recovered from discharged air, waste water and in particular the gland steam from laundry machines. This makes it possible to accumulate hot air or even hot water whose temperature is at least equal, if not greater, than the waste water, discharged air or gland steam of the laundry machines. To this end, the energy store preferably has an energy storage medium that stores heat at a temperature greater than 100° C.

BRIEF DESCRIPTION OF THE DRAWING

A preferred exemplary embodiment of the invention will be explained in more detail below on the basis of the drawing. The sole FIGURE of the drawing shows:

A flow chart illustrating the method according to the invention.

DETAILED DESCRIPTION OF PREFERRED EMBODIMENTS

The method illustrated here is employed to recover energy discharged by laundry machines, in particular heat energy, in such a manner that at least one portion of the energy can be reutilized in the operation of preferably laundry machines. The recovery of energy can be applied to all laundry machines used in commercial laundries which discharge unspent energy.

The drawing shows schematic representations of a washing machine, namely a tunnel washing machine 10, a dryer 11, a finisher 12 and a mangle 13. In these laundry machines—to which, however, the invention is not limited—a particularly large amount of heat energy accumulates, which is normally vented outside without being utilized. The energy discharged by the laundry machines takes the form of moist air, or gland steam. The gland steam still possesses a relatively high temperature that can be greater than 100 C. The object of the invention is therefore to recover at least part of the energy still contained in the gland steam so that it does not have to be released outdoors without being utilized.

The FIGURE shows gland steam lines 14 by means of which gland steam accumulating at the tunnel washing machine 10, the dryer 11, the finisher 12 and the mangle 13 can be conducted through a compressor 15 or also a pump 19 to a first heat exchanger 16. In this heat exchanger 16 the gland steam is converted into energy. The heat exchanger 16 can be a steam dryer, for example.

The heat exchanger 16 dries the gland steam supplied to it through the gland steam pipes 14. In the process, energy is extracted from the gland steam that is employed to heat up the water in the heat exchanger 16. The heated water is cycled through a heat exchanger line 17, specifically from the heat exchanger 16 to a further, second heat exchanger 18, and from the latter back to the first heat exchanger 16. A pump 19 circulates the water in the heat exchanger line 17.

The air, in particular hot air, dried in the (first) heat exchanger 16, is returned via a hot air line 20 from a compressor 21 assigned to the latter, or from a pump in the shown exemplary embodiment, to the dryer 11, finisher 12 and the mangle 13. By means of the appropriate valves (not shown) it is possible to alter the quantity of hot air delivered per time unit to the dryer 11, the finisher 12 or the mangle 13 as needed, or to supply the dryer 11, the finisher 12 and/or the mangle 13 only with hot air from the first heat exchanger 16.

The second heat exchanger 18 is provided via a feed line 22 with preferably cold fresh water or wash water from the tunnel washing machine 10. The wash water or fresh water, warmed in second heat exchanger 18 from the heat energy of the hot water heated by the first heat exchanger 16 and circulated via the heat exchanger line 17, is fed via a second heat exchanger line 23 to a hot water storage tank 24. The hot water storage tank 24, which is provided with insulation 25, stores the energy extracted from the gland steam by the first heat exchanger 16 in the form of hot water that has been heated by the second heat exchanger 18 until it is reutilized.

Three feeder lines 26, 27, 28 lead out of the hot water storage tank 24. Heated hot water can be optionally fed through the feeder lines 26, 27, 28 to the tunnel washing machine 10 or possibly to another laundry machine as well, such as the mangle 13. A feeder line 26, 27, 28 can also supply warm water for other uses that are not necessarily associated with laundry operations, such as district heating for heating houses or apartments.

It is also conceivable to include a heat exchanger or heat transfer medium having an higher boiling point in the secondary loop of the second heat exchanger 18, namely in the second heat exchanger line 23. Such a medium can also be arranged in a heat reservoir that is substituted for the hot water storage tank 24. This heat reservoir is then assigned a further (third) heat exchanger in which the heat reservoir medium heats wash water or fresh water as needed for supplying a laundry machine, in particular the tunnel washing machine 10 and/or the mangle 13. In the case of an oil-heated mangle 13, oil can also be heated by the heat transfer medium using a third heat exchanger in order to provide heat to the trough of the mangle 13, specifically at temperatures exceeding 100° C.

The method according to the invention is executed with the previously described central heat recovery installation as follows:

Gland steam from a plurality of laundry machines, in the shown embodiment from the tunnel washing machine 10, if necessary from a hydroextractor spin-dryer (not shown), the dryer 11, the mangle 13 and, if necessary, the finisher 12, is conducted to the heat exchanger 16, which is assigned to said laundry machines, for the central recovery of energy.

In the heat exchanger 16, the gland steam from in particular the tunnel washing machine 10, the dryer 11, the mangle 13 and, if applicable, the finisher 12 is dried, that is to say, moisture is extracted from the humid hot air of the gland steam. This is preferably carried out by employing the principle of a steam dryer, for example by conducting the gland steam through a water bath or other such liquid such that after the gland steam has been dried, dry hot air accumulates at the heat exchanger 16 and can be fed back to the tunnel washing machine 10, the dryer 11, the mangle 13 and, if applicable, the finisher 12 as needed. If necessary, the hot air line 20 leading to the laundry machines can be assigned a device for sterilizing and/or filtering the hot air, in particular for removing lint from the hot air. This step eliminates impurities from the dry hot air that were not removed in the heat exchanger 16 before the hot air is fed back to the laundry machines.

Provision is also made to utilize the energy recovered during the drying of the gland steam for heating water or some other liquid in the bath of the first heat exchanger 16. This heated liquid is employed via the second heat exchanger 18 for the indirect application of heat to fresh water, wash water or another heat transfer medium having a higher boiling point. This measure keeps the fresh water, the washing water or the heat transfer medium from any possible contact with the liquid of the first heat exchanger 16 that may have been contaminated by the gland steam. There is thus no carry-over of gland steam impurities into the fresh water or washing water heated by the waste heat of the gland steam. Above all, the second heat exchanger 18 can also be employed to use the energy recovered from the gland steam to heat a medium other than water to a relatively high temperature, such as oil or another heat transfer medium having a boiling point higher than that of water.

Provision is further made for the temporary storage of the fresh water, wash water or other heat transfer medium heated by the second heat exchanger 18. By virtue of this intermediate storage it is possible to utilize the recovered energy as needed, which means that the recovered energy does not have to be fed immediately to the laundry machines. The storage tank is expediently insulated in order to maintain the high temperature of the liquid or other heat transfer medium for an extended period of time without any appreciable loss of temperature. This allows the recovered energy to be utilized on the following working day without incurring any significant energy losses beforehand.

LIST OF DESIGNATIONS 10 tunnel washing machine
11 dryer
12 finisher
13 mangle
14 gland steam line
15 compressor
16 heat exchanger
17 heat exchanger line
18 second heat exchanger
19 pump
20 hot air line
21 compressor
22 feed line
23 second heat exchanger line
24 hot water storage tank
25 insulation
26 feeder line
27 feeder line
28 feeder line

What is claimed is:

1. A method for recovering heat energy released by a laundry machine, comprising the steps of:
    feeding the heat energy released by the laundry machine to a first heat exchanger (16), wherein the heat energy is in the form of moist hot air accumulating from the laundry machine,
    heating water with the heat energy in the first heat exchanger (16),
    dehumidifying the moist hot air in the first heat exchanger thereby converting the moist hot air into dry air and warm water,
    feeding the dehumidified dried air to the laundry machine, and
    cycling the warm water in a loop through a second heat exchanger (18), which heats a heat-transfer medium employed in the operation of the laundry machine.

2. The method according to claim 1, wherein the second heat exchanger (18) is arranged downstream of the first heat exchanger (16) and wherein the heat-transfer medium employed in the operation of the laundry machine is water heated by the second heat exchanger (18) and fed to the laundry machines.

3. The method according to claim 1, further comprising the step of converting the moist hot air conducted to the at least one heat exchanger (16, 18) into hot air.

4. The method according to claim 1, further comprising the step of converting the moist hot air conducted to the at least one heat exchanger (16, 18) into hot water.

* * * * *